Dec. 2, 1969   J. N. COOPER   3,481,038
KNIFE CONSTRUCTION
Filed Nov. 13, 1967
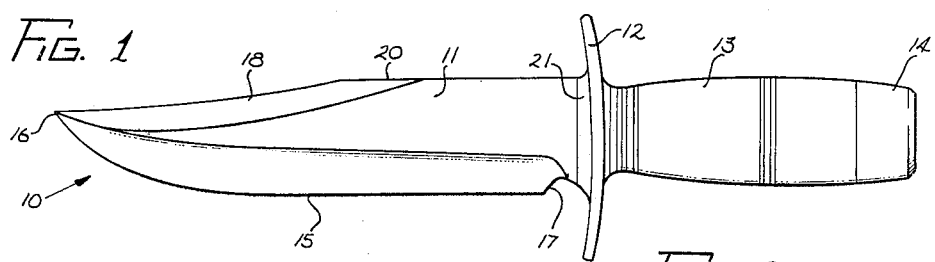
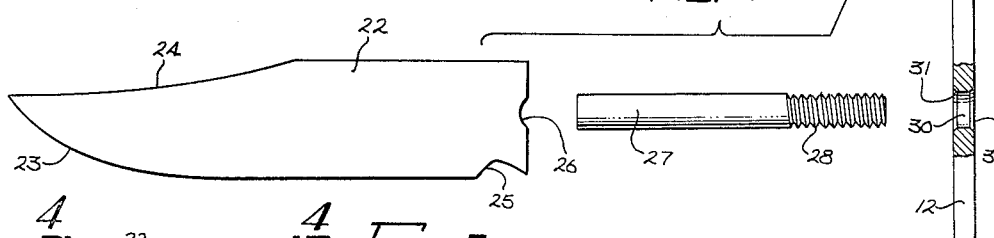
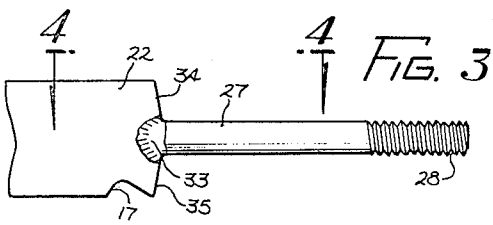
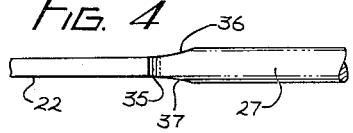
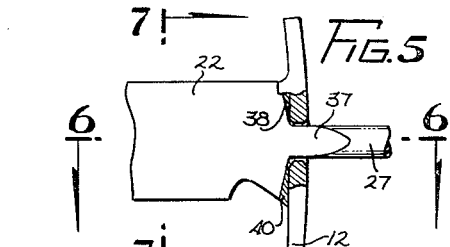
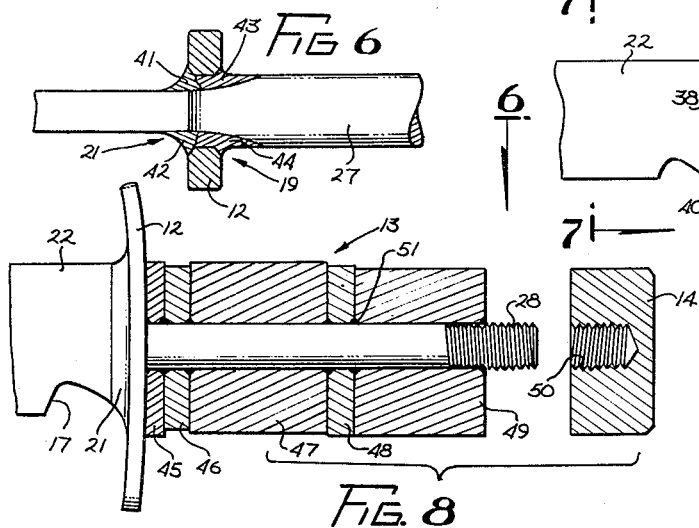
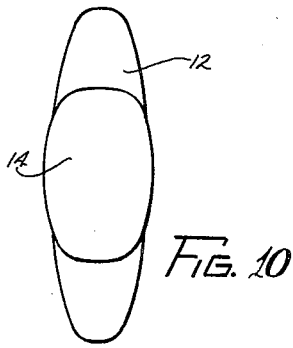
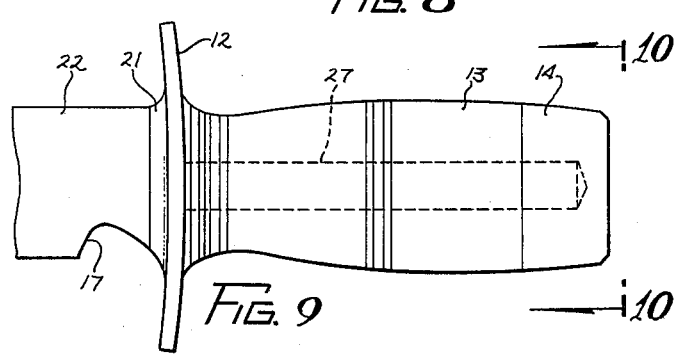
JOHN N. COOPER
INVENTOR.
BY Roger G. Marrs 3,481,038
KNIFE CONSTRUCTION
John N. Cooper, Los Angeles, Calif.
(2200 Burbank Blvd., Burbank, Calif. 91506)
Filed Nov. 13, 1967, Ser. No. 682,470
Int. Cl. B25g *3/02;* B26b *29/00;* B23k *31/02*
U.S. Cl. 30—344                                8 Claims

ABSTRACT OF THE DISCLOSURE

The knife construction disclosed herein includes a blade, handle tang and hilt composed of different materials which are fusibly joined along their common surfaces employing selected brazing materials and selected brazing and tempering temperatures to produce a non-porous fusion joint of high strength and prolonged longevity.

BACKGROUND OF THE INVENTION

Field of the invention

This invention relates to knife constructions and, more particularly, to a novel construction of this class for joining several separate and distinct component parts of the knife into a unitary construction adapted to receive extensive abuse while in use without suffering adverse effects of metal fatigue, loss of finish lustre or breakage.

Description of the prior art

In the past, it has been the conventional practice to produce a utility knife such as may be used in fishing, hunting, fighting or the like by fabricating the blade and handle tang from the same blank of metal. Next, the hilt or guard is placed about the tang at its integral merger with the blade and the mating surfaces of the construction are soldered or welded to form a bonded joint. A handle portion is then mounted onto the tang which completes the construction of the knife after the blade has been shaped and the exposed metal portions suitably polished.

Although this common practice results in a generally acceptable knife construction, it has been found that the joint is unsatisfactory since the weakest part of the knife is at the joint location where the blade is integrally formed with the tang. Inasmuch as the tang is substantially smaller in overall cross-sectional area than the cross-sectional area of the blade, the joint area has a tendency to rapidly deteriorate under extensive stress and loading conditions. For example, the handle surrounding the tang is grasped by the user and the blade is employed for chopping or cutting operations which places the maximum load at the leverage point defined at the integral joint of the tang with the blade. Such loading has a tendency to forcibly bend at this critical location until the tang breaks away from the blade.

Furthermore, the welding procedure for fusing the hilt or guard to the blade and tang is generally of a porous nature which permits air and moisture to combine with the metal to cause corrosion and rust. After continuous use of the knife, the deterioration further fatigues and weakens the joint at this critical location which results in breakage thereof.

In other constructions, an attempt has been made to avoid the above problems by constructing the blade and handle tang from two separate pieces which are joined together by a threadable connection or other type of fastening means. Obviously, such a practice is expensive and requires precision tolerances and additional manufacturing procedures which complicate the construction. Furthermore, such a practice does not avoid the adverse effects of porous construction and material deterioration due to exposure to a corrosive environment.

SUMMARY OF THE INVENTION

Accordingly, the problems and difficulties encountered with conventional knife constructions are obviated by the novel knife construction and method of fabrication of the present invention which provides separate components such as the blade, handle tang and hilt which are composed of different materials that are joined together in an integral unitary structure by a eutectic joint having the physical characteristic of being non-porous. The base of a metal blank for the blade is formed with a notch adapted to receive the end of a bolt intended to comprise the handle tang. The end of the bolt is seated in the notch and welded thereto so that fusion takes place to form in integral joint between the bolt and the blade blank. A hilt is formed with a central hole adapted to be inserted over the bolt and seated adjacent the base of the blade. The hole is countersunk on both sides of the hilt so as to provide suitable recesses for receiving eutectic material during a brazing procedure which integrally forms the hilt with the bolt and metal blank of the blade. The material disposed in the recesses form fillets which are of non-porous composition and which are compatible with the material of the components to provide a eutectic joint which is resistive to corrosive environments.

Preferably, the material of the blade and handle tang is of stainless steel while the hilt is composed of bronze material. A handle composed of phenolic micarta may be secured about the handle tang and suitably shaped to accommodate the hand grasp of the user. The blade blank may be suitably ground to provide a cutting edge and/or a false edge as well as to provide a ricasso adjacent the hilt in the base portion of the blade. After securement of a butt cap on the tang and suitably polishing the exposed metal surfaces, the knife construction is complete and ready for use.

Therefore, it is among the primary objects of the present invention to provide a novel knife construction and method of fabricating which results in a unitary structure formed by a common eutectic joint integrally connecting the blade, handle tang and hilt.

Another object of the present invention is to provide a novel knife construction including a non-porous joint integrally forming the blade, handle tang and hilt so as to be resistive to corrosive conditions and which exhibits characteristics of high strength.

Still another object of the present invention is to provide a novel knife construction and method of fabrication by which an integral joint is produced at the junction of the hilt, handle tang and base portion of the blade by means of brazing techniques and fillet materials effective to fuse together at selected temperatures so as to provide a strong bond therebetween.

Still a further object of the present invention is to provide a novel knife construction resulting in a knife of high strength, impervious to a corrosive environment and which may be highly polished to produce a lasting luster and which may be subjected to extensive abuse during

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a side elevational view of a knife formed from the novel construction of the present invention;

FIGURE 2 is an exploded view illustrating the component parts of the knife construction preparatory to being integrally joined;

FIGURE 3 is a fragmentary view of the handle tang welded to the blade blank;

FIGURE 4 is a top plan view of the welded joint as taken in the direction of arrows 4—4 of FIGURE 3;

FIGURE 5 is a fragmentary view, partly in section, illustrating the brazing of the guard or hilt onto the handle tang and base portion of the blade at the welded joint;

FIGURE 6 is a longitudinal cross-sectional view of the knife construction shown in FIGURE 5 as taken in the direction of arrows 6—6 thereof;

FIGURE 7 is a transverse cross-sectional view taken in the direction of arrows 7—7 of FIGURE 5;

FIGURE 8 is an exploded sectional view of the handle portion of the knife construction preparatory to securement of the cap butt and shaping;

FIGURE 9 is a side elevational view of the handle portion showing a finished shape; and FIGURE 10 is an end elevational view of the knife construction as taken in the direction of arrows 10—10 of FIGURE 9.

DESCRIPTION OF THE PREFERRED EMBODIMENTS

Referring to FIGURE 1, a knife construction of the present invention is illustrated in the general direction of arrow 10 and the construction represents a finished product. The knife construction includes a blade 11, a hilt or guard 12 and a shaped handle 13 terminating in a butt cap 14. The shape of the handle 13 and butt cap 14 are compatible so that the handle may be readily grasped by the user and the user's hand is protected from the blade by the hilt 12. The blade includes a ground cutting edge 15 terminating in a point 16 at one end and a ricasso 17 formed in the base portion of the blade adjacent the hilt 12. The blade is also provided with a false edge 18 ground on the back side of the blade terminating in point 16 on one end and terminating midway between the opposite ends of the blade along a back 20. A fillet 21 extends between the base portion of the blade and the hilt 12 and is of a non-porous characteristic. The fillet 21 is continuous about the knife construction and fusibly joins the hilt 12 with the base of the blade 11.

Referring now to FIGURE 2, the knife construction 10 is initially fabricated by providing a blank 22 for the blade which is cut from suitable knife stock such as stainless steel. The material is carefully and skillfully cut to obtain the proper length, width, etc. to be compatible with the overall dimensions of the finished knife. The blank is formed, for example, by grinding to the desired blade outline configuration by removing stock material therefrom. An emery wheel may be employed for removing the material. The desired blade outline shape may take the form of an edge 23 representing the knife edge 15, an edge 24 which will ultimately be the false edge 18, a cutout 25 for the ricasso and a notch 26 formed in the base of the blade blank 22. The notch 26 is made in the base end of the blade for subsequent fitting therewith of a handle tang which takes the form of a bolt 27. The handle tang is formed from a threaded machine bolt and serves as an anchor for the later addition of the handle itself. A threaded end 28 of the bolt which is on the opposite end to the end seated in the notch 26 serves to receive the butt cap of the handle which will be described later.

Another component part of the knife construction resides in the hilt or guard 12 which is preferably composed of bronze material and includes a central aperture 30 located midway between its opposite ends. The opposite sides of the hilt 12 are countersunk about the aperture 30 so as to form recesses 31 and 32.

Referring now to FIGURE 3, the handle bolt forming tang 27 is shown secured to the base portion of the blade blank 22 by means of acetylene welding at a joint 33. An emery wheel is employed to form an angular cut on opposite sides of the joint in the base of the blade as represented by numerals 34 and 35 in preparation to receive the hilt 12 after it has been shaped. Also, the opposite sides of the joint 33 are ground by an emery wheel to remove excess metal therefrom so that the joint is tapered on its opposite sides as shown by numerals 36 and 37 in FIGURE 4.

Referring now to FIGURE 5, the hilt 12 is formed with a slight curve or arcuate shape so that when the bolt 27 is inserted through the aperture 30, the front face of the hilt 12 will substantially coincide with the base of the blade 22. However, exact surface mating is avoided so that a pair of gaps 38 and 40 are provided into which a eutectic material is disposed so as to form a fusible bond between the blade and the hilt.

In actual practice, the blade, handle tang and the hilt are secured by first inserting the hilt aperture over the handle tang and advancing the hilt against the base of the blade. The hilt is fused to the handle tang and the sides of the blade from the bottom, or blade side, using a bronze rod and an acetylene torch. Extreme caution must be taken to attain a non-porous weld to prevent pits in the finished exposed surface of the hilt. The blade is then held in a vise so that the handle tang is straight up. The hilt is then finally and completely made a part of the already joined blade and handle bolt.

As shown in FIGURE 6, the bronze rod weld is indicated by numerals 41 and 42 which joins the front side of the hilt with the blade and constitutes the fillet 21. The bronze rod material forming the weld occupies the recess 31 formed in the hilt and partially occupies the aperture 30 surrounding the joint 33. Using a silver brazing rod with a tensile strength of approximately 60,000 p.s.i., the hilt 12 is silver brazed wrom the rear or handle side so as to occupy the recess 32 forming a continuous fillet 43 and 44 on opposite sides of the construction. The recesses on both sides of the aperture 30 allow complete fusing of blade and tang with the hilt to form an integral joint.

After suitable cooling, the unit is cleaned on a sanding wheel which removes excess bronze from the blade side and bolt side of the hilt as well as from the hilt itself. Next, the blade is operated upon by the emery wheel where approximately 80% of the hollow grinding process is accomplished to form the blade edge 15 and false edge 18. However, no more than 80% of the hollow grind can be done at this point so that blade warpage during the subsequent tempering process is prevented.

Next, the knife construction is placed in a firebrick enclosure and the blade is heated with an acetylene torch to approximately 1400° F. Again, extreme care is required because of the difference in melting temperatures of the metals composing the construction. Through experience using color charts of heat treated metal in various stages, it can be readily determined by visual means when the blade has reached the desired temperature. Once more, stress must be placed on the careful use of the torch at this time to prevent warpage and/or melting through overheating or improper tempering through underheating. As soon as the blade has been brought to the proper temperature, the construction is immediately immersed in a container of suitable quenching oil. The construction is maintained in the oil bath until completely cooled. At this time, the blade is extremely hard and brittle and to complete the tempering process, the construction is now placed in an electric oven and is slowly brought to a temperature of approximately 450° F. thermostatically. The construction is then removed from the oven and allowed to cool at room temperature. At this time, a completely tempered construction is provided.

Referring now to FIGURE 8, the handle 13 and butt cap 14 are initially made in rough form. The handle is composed of oblong-shaped phenolic micarta blocks 45–49 inclusive, of varying thicknesses depending upon the desired ultimate design. Each block is then drilled to provide a hole adapted to receive the handle tang. Each hole is provided with a countersink on the opposite openings of the hole from each side of the block to facilitate assembly of the blocks. The butt cap is fashioned from cast brass and is drilled on one side with a threaded hole 50 adapted to threadably mate with the end 28 of the handle tang.

Each micarta block is placed separately on the handle tang and secured. The block 45 is secured to the hilt and subsequent blocks, if used, are secured one on top of the other. Bonding of the blocks is achieved through the use of a suitable industrial epoxy cement. The double countersinks permit the use of additional cement over a larger area of coverage so as to guarantee complete bonding of the blocks together. As shown in FIGURE 8, the bonding cement is illustrated in adjacent coaxial countersinks as represented by the numeral 51 between adjacent surfaces of blocks 48 and 49.

Preparatory to attaching the butt cap 14 to the threaded end 28 of the handle tang 27, the threads of the handle tang are liberally coated with epoxy cement. The covered threads are then inserted into the threaded recess 50. The butt cap 14 is then screwed on the threaded end 28 of the handle tang and suitably tightened. The tightening action compresses the micarta blocks further to ensure their bonding together. The cement is then dried for approximately 24 hours so that the micarta blocks will not separate and they become an integral piece constituting the handle.

Next an emery wheel is applied to the handle and butt cap where the micarta blocks and butt cap are ground to a desired shape. After the rough shape has been achieved, a sanding wheel is applied where the handle and butt cap are sanded and resanded using various grits of suitable resin bonded cloth. When this process is completed, a perfectly shaped, smooth handle and butt cap is produced, such as is shown in FIGURES 9 and 10.

The final step in the construction of the knife of the present invention provides for the final hollow grinding of the blade blank 22 which again requires the use of a grinding means such as an emery wheel, for example. Since the blade will heat fairly rapidly under grinding, thus losing its temper, extreme care must be exercised to avoid prolonged grinding. The finished grinding is a slow process as the blade must be constantly cooled. The blade is hollow ground into 98% of its final form during this final grinding procedure and from the emery wheel, the blade is taken to the sanding wheel where it is smoothed and all scratches are removed. Various degrees of grit cloth may be used with the last being of a grade of 320 grit. Preferably, this grit cloth is graded immediately under the grade of polish per se. Next, final beautification of the knife is achieved with a soft cloth polishing wheel.

All that remains now is the final 2% of the hollow grinding process which is represented by the sharpening of the blade. The edges 15 and 18 are formed in a careful operation since, when it is complete, razor sharp edges are provided which are fully capable of shaving a heavy beard or skinning several animals without resharpening. For storage purposes, a thin film of oil may be placed on all exposed polished surfaces of the knife construction.

From the foregoing, it can be seen that the novel knife construction of the present invention and method provides a joint at the point of the blade base with the hilt and handle tang which is integral, having a non-porous characteristic and which bonds materials of different composition together. Such a joint is resistive to corrosive action and is capable of withstanding heavy stress under abnormal loading conditions during use.

While particular embodiments of the present invention have been shown and described, it will be obvious to those skilled in the art that changes and modifications may be made without departing from this invention in its broader aspects.

What is claimed is:
1. In a knife construction, the combination comprising:
  a blade having a pre-cut notch formed in its base end;
  a handle tang having the terminating end of a selected one of its ends adapted to be seated in said blade base notch;
  a hilt formed with a central aperture adapted to be carried on said handle tang adjacent said blade base portion; said blade and said handle tang being composed of steel composition and said hilt being composed of bronze;
  a eutectic joint formed at the common abutting surfaces of said blade base portion; said eutectic joint including a first fillet composed of bronze material brazed between said blade base and the forward surface of said hilt; and a second fillet composed of silver brazed between said handle tang and the rear surface of said hilt; and
  said handle tang and said hilt producing an integral fillet formation of non-porous characteristics so that said blade, handle tang and hilt form a unitary structure.
2. The invention as defined in claim 1 wherein said hilt includes a recess formed therein at the openings of said aperture on opposite sides of said hilt and coaxial therewith; and wherein
  material of said first fillet occupies one recess and material of said second fillet occupies the other of said recesses.
3. The invention as defined in claim 2 wherein said handle tang and said blade base are joined by a welded joint.
4. The invention as defined in claim 3 wherein said last mentioned welded joint is ground to a smooth taper on the oppoiste sides thereof so as to be coextensive with the respective opposite sides of said blade.
5. The invention as defined in claim 4 wherein said handle tang is substantially circular in cross-section and further includes a plurality of threads formed on its end opposite to the end secured to said blade base.
6. The invention as defined in claim 5 including
  a handle comprising a plurality of blocks having a coextensive coaxial bore formed therethrough adapted to insertably receive said handle tang; and
  a butt cap formed with a threaded recess adapted to threadably engage with said threaded end of said handle tang for securing said blocks thereon and for compressing said blocks against said hilt.
7. The invention as defined in claim 6 wherein each handle block of said plurality includes a countersunk recess about the openings of said central bore through each of said blocks; and
  bonding means occupying said countersunk recesses and disposed along said handle tang to effect securement between said handle tang and said blocks.
8. The invention as defined in claim 7 wherein the terminating end of said blade base is angularly disposed with respect to the forward surface of said hilt so as to define a pair of gaps therebetween adapted to be occupied by material of said first fillet.

(References on following page)

References Cited

UNITED STATES PATENTS

| | | | |
|---|---|---|---|
| 794,591 | 7/1905 | Decherd | 30—344 |
| 1,989,225 | 1/1935 | Campbell | 30—342 |
| 3,119,632 | 1/1964 | Skinner | 29—471.7 X |
| 3,205,517 | 9/1965 | Hinrichs | 30—295 X |

FOREIGN PATENTS

Ad. 1,480 11/1869 Great Britain.

ANDREW R. JUHASZ, Primary Examiner

G. WEIDENFELD, Assistant Examiner

U.S. Cl. X.R.

29—471.7; 30—295; 76—104